United States Patent [19]

Miyagawa et al.

[11] Patent Number: 4,911,298
[45] Date of Patent: Mar. 27, 1990

[54] CASSETTE STORAGE CONTAINER

[75] Inventors: Hiroshi Miyagawa, Takatsuki; Isamu Arai, Itami, both of Japan

[73] Assignee: Hitachi Maxell, Ltd., Osaka, Japan

[21] Appl. No.: 331,393

[22] Filed: Mar. 31, 1989

Related U.S. Application Data

[63] Continuation of Ser. No. 571,676, Jan. 17, 1984, abandoned.

[30] Foreign Application Priority Data

Jan. 19, 1983 [JP] Japan .................................. 58-6720
Jul. 23, 1983 [JP] Japan ................................ 58-114862

[51] Int. Cl.$^4$ ............................................ B65D 85/672
[52] U.S. Cl. ................................ 206/387; 206/45.31; 220/82 R
[58] Field of Search .................. 206/45.31, 45.34, 387; 65/44; 428/34, 172; 220/82 R

[56] References Cited

U.S. PATENT DOCUMENTS

| | | | |
|---|---|---|---|
| 2,115,972 | 5/1938 | Dunkle | 428/173 |
| 3,017,987 | 1/1962 | Moslo | 206/45.39 |
| 3,288,347 | 11/1966 | Commisso et al. | 206/45.33 |
| 3,432,380 | 3/1969 | Weber | 206/45.31 |
| 3,489,270 | 1/1970 | Bixler et al. | 206/45.31 |
| 3,848,046 | 11/1974 | Machet | 65/44 |
| 3,935,359 | 1/1976 | Rowland | 428/172 |
| 4,405,676 | 9/1983 | Pohl | 428/172 |
| 4,445,634 | 5/1984 | Sato | 206/387 |
| 4,555,021 | 11/1985 | Fujii et al. | 206/387 |

FOREIGN PATENT DOCUMENTS

| | | | |
|---|---|---|---|
| 0148848 | 11/1979 | Japan | 428/172 |
| 0038157 | 3/1983 | Japan | 428/172 |

OTHER PUBLICATIONS

"Glass", Catalog for the Architect, Libbey, Owens, Ford Glass Company, 1947, pp. 1-24.

Primary Examiner—Jimmy G. Foster
Attorney, Agent, or Firm—Birch, Stewart, Kolasch & Birch

[57] ABSTRACT

A cassette storage container for covering a tape cassette, the container having a case body formed by a plastic resin sheet of transparent or semi-transparent material which comprises a multiplicity of projections in the form of ribs or verrucae formed on the inner face of the case body for providing a rough surface and an opaque layer formed on the outer surface of the case body, the area of the opaque layer being at most covering the entire surface area of the outer surface of the container except for at least the portion corresponding to a label of the tape cassette put in its stored position in the container so as to define a display window for displaying the label of the tape cassette.

7 Claims, 14 Drawing Sheets

FIG. 18
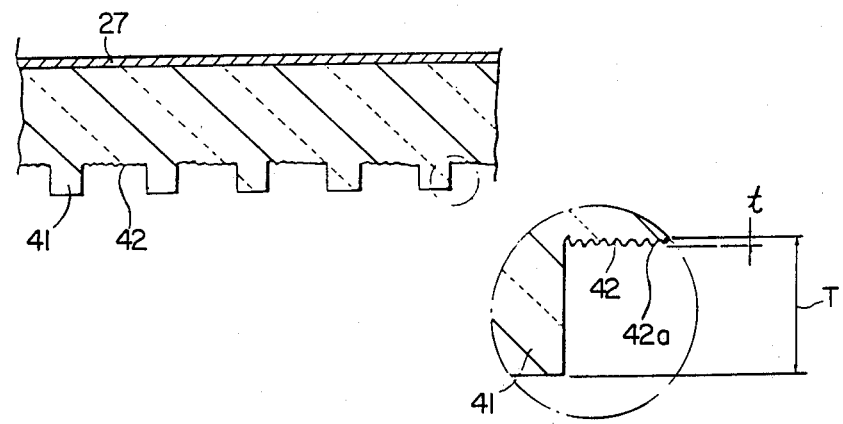
FIG. 18A
FIG. 19
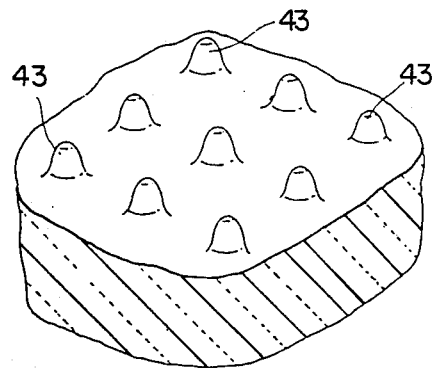

CASSETTE STORAGE CONTAINER

This application is a continuation of copending application Ser. No. 571,676, filed on Jan. 17, 1984 now abandoned.

BACKGROUND OF THE INVENTION

The present invention relates to a cassette storage container made of a plastic resin sheet material.

There has been proposed a cassette storage container made of a cardboard material in the form as shown in FIG. 1 for containing a video tape cassette 100 as shown in FIG. 2, wherein a case body 1 is provided with a transparent window 30 for visually displaying a label 25 attached on one surface of the video tape cassette 100 when the cassette 100 is accommodated in the case body 1. In the conventional cassette storage container, the window 30 is formed by defining an opening 31 on the corresponding face of the case body 1 with a transparent sheet 32 fitted on the inner surface of the case body 1 so as to cover the opening 31. Apparently, for manufacturing the conventional cassette storage containers, two members i.e., the case body and the transparent sheet for the window are necessary and furthermore, since the transparent sheet 32 must be adhered on the case body, the manufacturing process is complicated, thereby making the manufacturing cost to be expensive.

In order to eliminate the drawbacks as described above, there has been proposed making the cassette storage container of one transparent plastic resin sheet. However, when a plurality of the transparent plastic resin sheets are stacked, they tend to fit or stick to each other. Therefore, in the manufacturing of the cassette storage containers using such transparent plastic resin sheets in attempting to take the lowest sheet from the stacked sheets one by one, two or more sheets undesirably are removed from the stacked sheets at a time. In such a case each of the fitted sheets must be manually separated, thereby lowering productivity of the cassette storage containers. Furthermore, scratches may easily occur on the transparent sheets when separating the fitted sheets whereby the appearance of the containers may be harmed.

In order to eliminate these drawbacks it has been further proposed to make the cassette storage containers using sheet materials having rough surfaces. In this case, however, since the transparency of the case body is not sufficient, the contents of the label on the video tape cassette accommodated in the cassette storage container may not be clearly seen through the window.

SUMMARY OF THE INVENTION

An essential object of the present invention is to provide a cassette storage container having sufficient transparency so that the display of the information on the tape cassette accommodated in the case body can be easily read.

Another object of the present invention is to provide a cassette storage container wherein scratches on the surface of the cassette storage container are inconspicuous even if such scratches occur when inserting a tape cassette into or removing the cassette from the storage container.

A still further object of the present invention is to improve the productivity of the cassette storage containers.

In order to attain the objects as mentioned above the present invention is characterized by using transparent or semi-transparent sheet material having one of the surfaces of the sheet materials made with a rough face to have a transparency haze factor of less than 50% so as to assure separation of each of the sheets when being removed from stack of the sheets.

It is noted that the term "haze factor" is defined in the JIS (Japan Industrial Standard) K 7500 and the term means a degree of diffusion of light incident to a transparent plastic resin material, this degree being expressed in terms of percent of a ratio between the amount of the diffused light passed through the plastic resin material to the amount of the total light passed through the plastic resin material.

According to one aspect of a specific feature of the cassette storage container of the present invention, a transparent plastic resin sheet is passed through a pair of rolers including a smooth roller and embossing roller for embossing one of the surfaces of the sheet with a rough surface, subsequently, the transparent sheet is transferred to a punching machine whereby a few case at a time are punched in an unfolded configuration from the transparent sheet. Subsequently, each of the unfolded case bodies is formed with necessary folding lines by hot dies and in turn the punched sheets are folded along the folding lines so as to form box-like case bodies with the necessary parts bonded by a supersonic bonding or a hot melt bonding.

As the transparent sheet material, vinyl chloride or polypropylene resin materials may be used. The expanded vinyl chloride sheet has an excellent transparency and many adhesive materials for the vinyl chloride material are commercially available. Particularly the propylene resin is preferred as the transparent sheet for the case body in that the sheet material made of the block polymer or co-polymer of ethylene and polypropylene has a good hinge characteristic with respect to the folding lines preliminarily formed, therefore, the sheet can be easily folded at a right angle.

BRIEF DESCRIPTION OF THE DRAWINGS

FIG. 19 is a partial perspective view showing a still further modification of the inside of the cassette storage container according to the present invention.

DETAILED DESCRIPTION OF THE PREFERRED EMBODIMENTS

Figure 2:
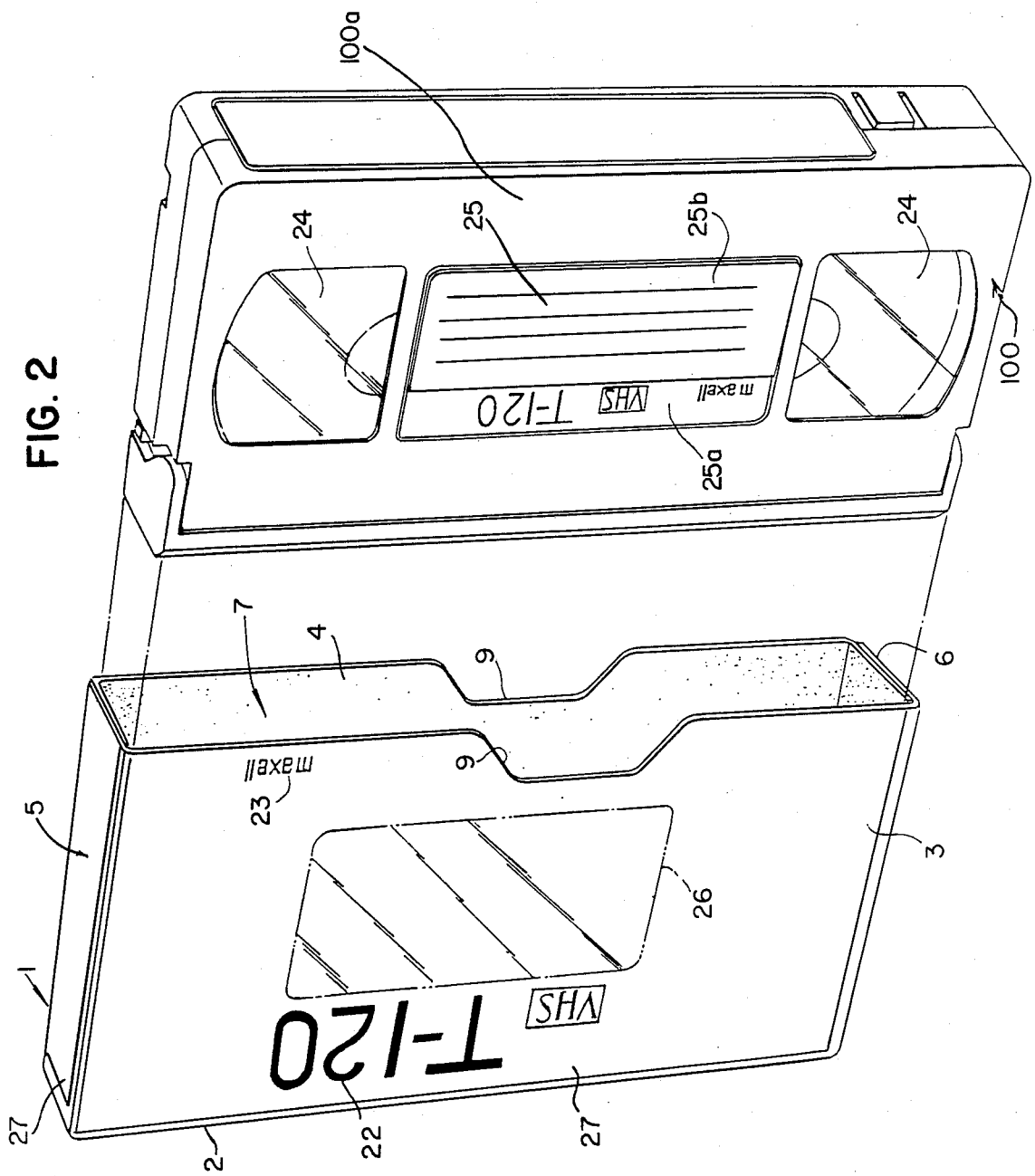
FIG. 2 is a perspective view showing an example of one embodiment of a cassette storage container according to the present invention accompanied by a video cassette as shown.

Referring to FIG. 2, a case body 1 of the cassette storage container for containing a video tape cassette 100 comprises a rear plate 2, a pair of side plates 3 and 4, and a pair of top and bottom plates 5 and 6 to form a container in the form of a book case having an opening 7 for receiving the video tape cassette 100. A pair of cut portions 9 are formed at the intermediate portion of the side plates 3 and 4, near the front opening 7, so as to facilitate holding the side faces of the video tape cassette between the fingers when introducing or drawing out the video tape cassette.

Figure 4:
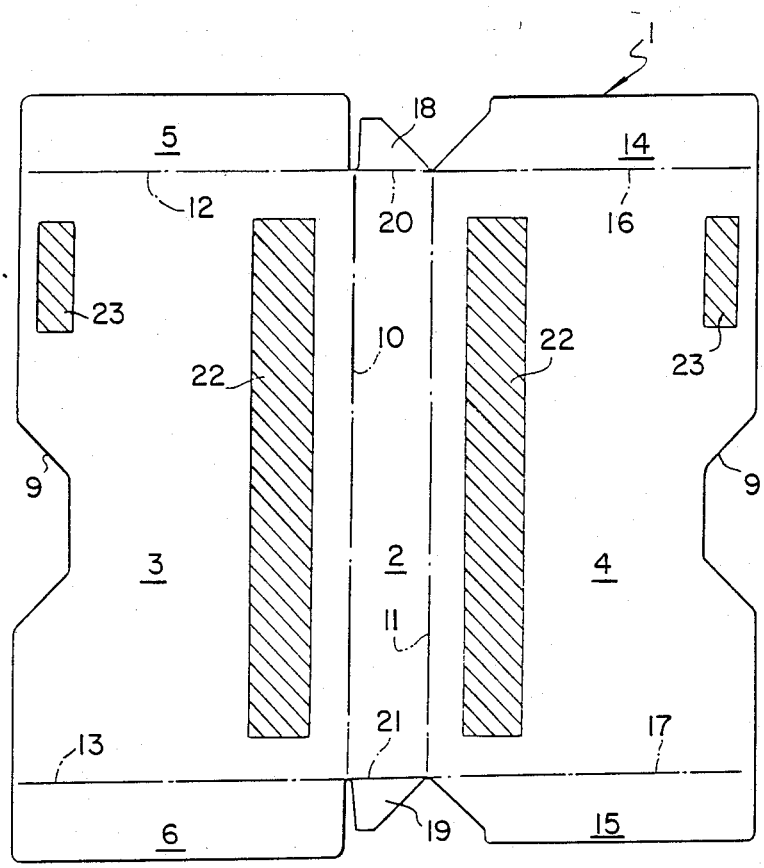
FIG. 4 is a plan view showing an unfolded state of the case body of the cassette storage container shown in FIG. 2.

FIG. 4 shows an unfolded case body 1 before it is shaped into the cassette storage container, wherein the pair of side plates 3 and 4 are connected with both sides of the rear plate 2 through the folding lines 10 and 11. The pair of cut portions 9 are symmetrically formed on both side edge portions of the side plates 3 and 4. The top plate 5 and the bottom plate 6 are connected with the top edge and the bottom edge of the left side plate 3 through the folding lines 12 and 13. A pair of overlap width portions 14 and 15 are connectedly formed on both the top edge and the bottom edge of the right side plate 4 through the folding lines 16 and 17. A pair of overlap width portions 18 and 19 are connectedly formed on the top edge and the bottom edge of the rear plate 2 through the folding lines 20 and 21. Each of the plates and the overlap width portions are folded at right angles along the folding lines respectively so as to form a generally rectangular box or book box with the width portions 14 and 18 overlapped placing the portions 14 and 18 inside of the top plate 5 and the width portions 15 and 19 overlapping so as to place the portions 15 and 19 inside of the bottom plate 6. The respective overlapping portions are bonded together by supersonic welding or a hot melt welding so that the case body 1, as shown in FIG. 2, is formed.

Figure 1:
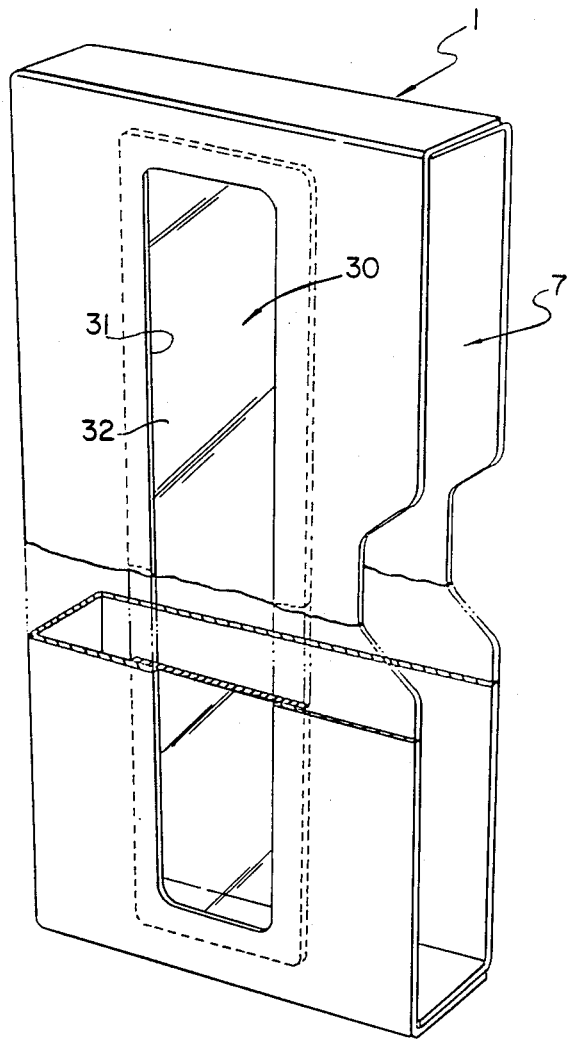
FIG. 1 is a perspective view showing a conventional cassette storage container.
Figure 3:
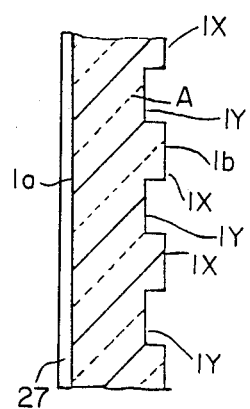
FIG. 3 is a partial cross sectional view showing an essential portion of the cassette storage container shown in FIG. 2.

According to the present invention, the case body 1 is formed of a propylene sheet material A having a first or obverse face with a flat, smooth surface 1a, a second or reverse face with a rough surface 1b, as shown in FIG. 3, with a transparency haze factor of 50% through 5%, in such a manner that the inner face of the case body 1 is the rough surface 1b.

The video tape cassette 100 is provided with a label 25 formed by a printed portion 25a in which the various properties of the video tape cassette are described by the manufacturer and a describing portion 25b for the user on the central portion of the top face 100a. Reference numeral 24 shows transparent window for visually displaying the amount of the roll of the video tape.

The outer surface of the case body 1, other than a display window 26 in the left side plate 3, is made opaque by way of forming a printed coating layer 27 with a color or colors and, if necessary, the displays 22 and 23, which indicate, for example, the maximum time of the recording tape and the name of the manufacturer or seller of the tape cassette so that the label 25 of the video tape cassette can be seen from outside of the case body 1 through the display window 26 which has a suitable transparency of the transparent sheet material A when the video tape cassette is put in position in the cassette storage container.

Figure 7:
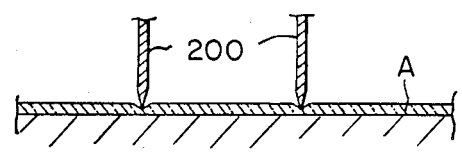
FIG. 7 is a partial cross sectional view showing a way of forming the folding lines on the transparent sheet.
Figure 5:
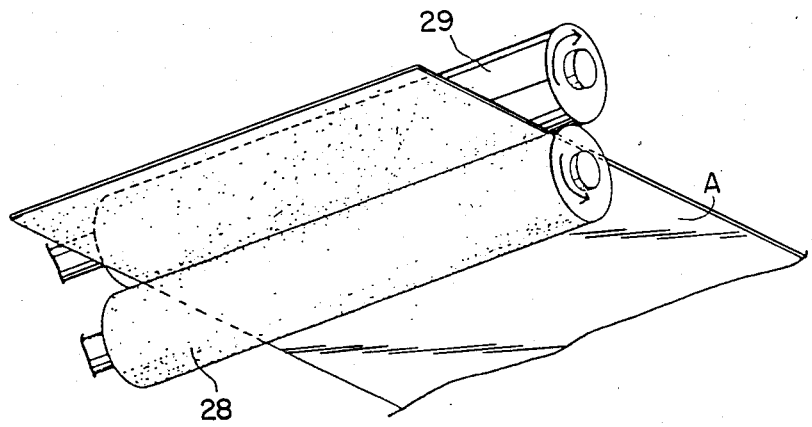
FIG. 5 is a perspective view showing a way of embossing the transparent sheet by a pair of rollers.
Figure 6:
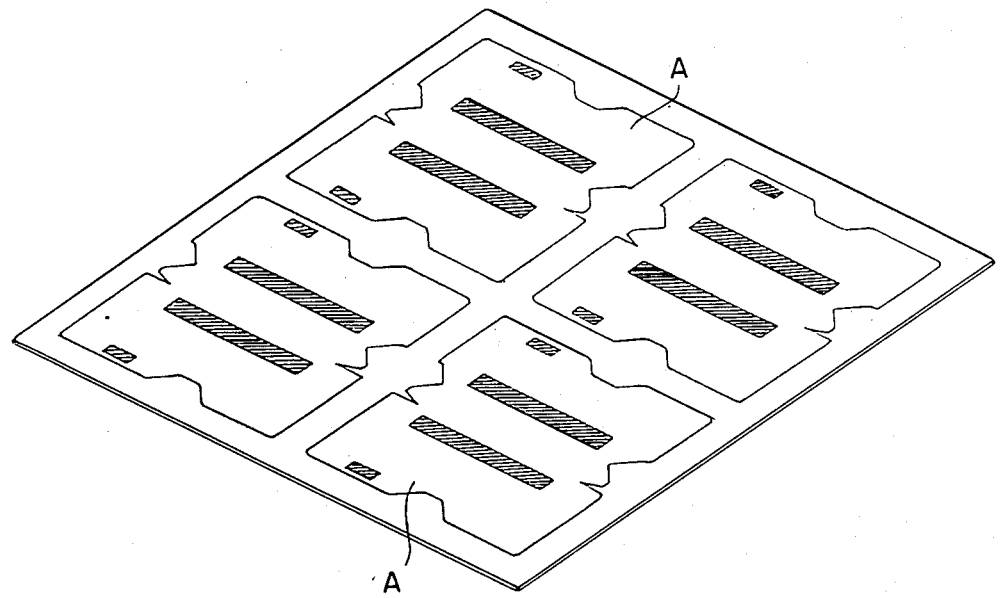
FIG. 6 is a perspective view showing a way of forming four unfolded case bodies formed on one transparent sheet.

The transparent sheet material A is produced in such a manner that a continuous sheet material of propylene resin is passed between a rough roller 28 and a smooth roller 29, opposed to the rough roller 28, when the sheet is made from a melted propylene resin, as shown in FIG. 5. In this process, the sheet material is provided with the transparency haze factor of less than 50% preferably less than 5%. The rough roller 28 is plated, thereby causing the respective surface having the projected portions 1X and the recessed portions 1Y of the rough surface 1b to be formed as specular surfaces. Subsequently, each of the transparent sheets A is processed for printing such patterns 27, as shown in FIG. 2, on the smooth surface 1a. Then the printed sheets A are stacked and, in turn, a printed sheet A existing either at the bottom or at the top of the stacked sheets is removed one by one, whereby several unfolded case bodies are punched from one sheet A, as shown in FIG. 6. Subsequently, each of the unfolded case bodies is processed to form the folding lines 10 through 13, 16, 17, 20 and 21 by pressing hot dies 200 on the unfolded case body, as shown in FIG. 7. Then the case body 1 is formed in the manner as described above.

Figure 8:
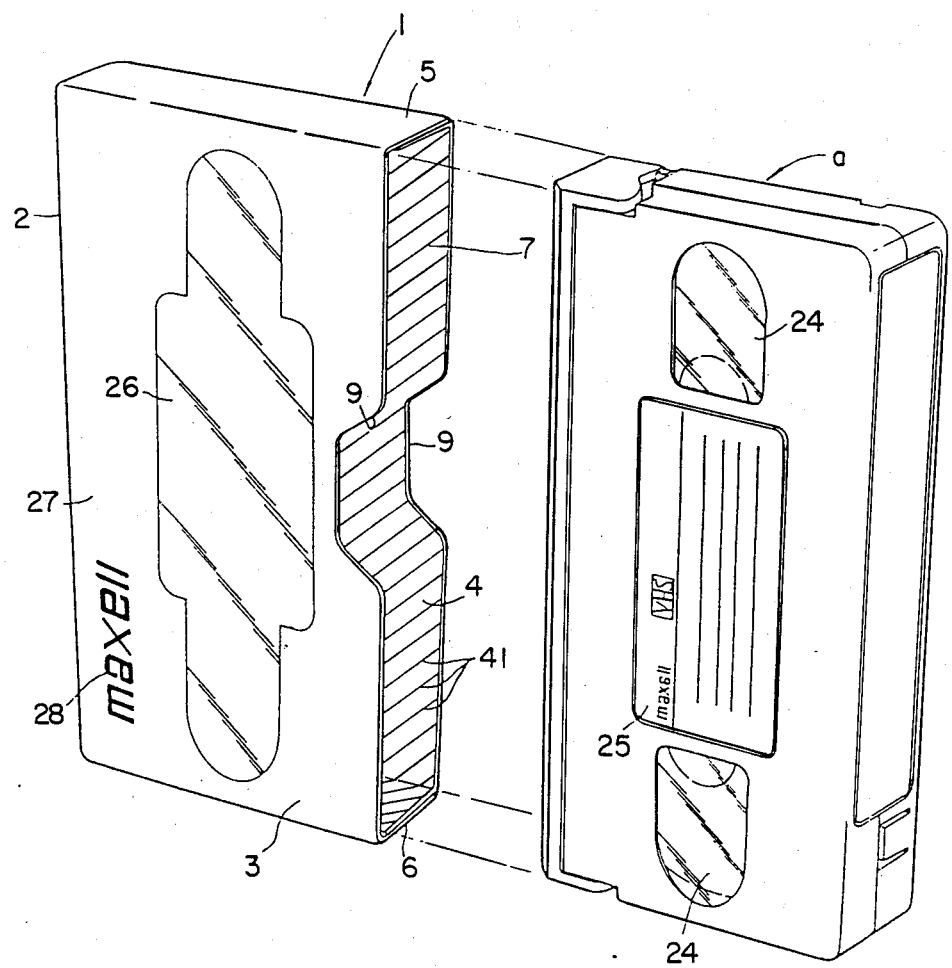
FIG. 8 is a perspective view showing another example of the cassette storage container according to the present invention.
Figure 11:
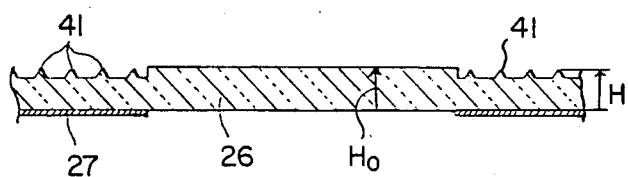
FIG. 11 is a partial cross sectional view showing a modification of the corresponding portion of the case body shown in FIG. 10, FIGS. 12 and 13 are partial plan views of the unfolded case bodies showing further examples of the cassette storage container according to the present invention.
Figure 9:
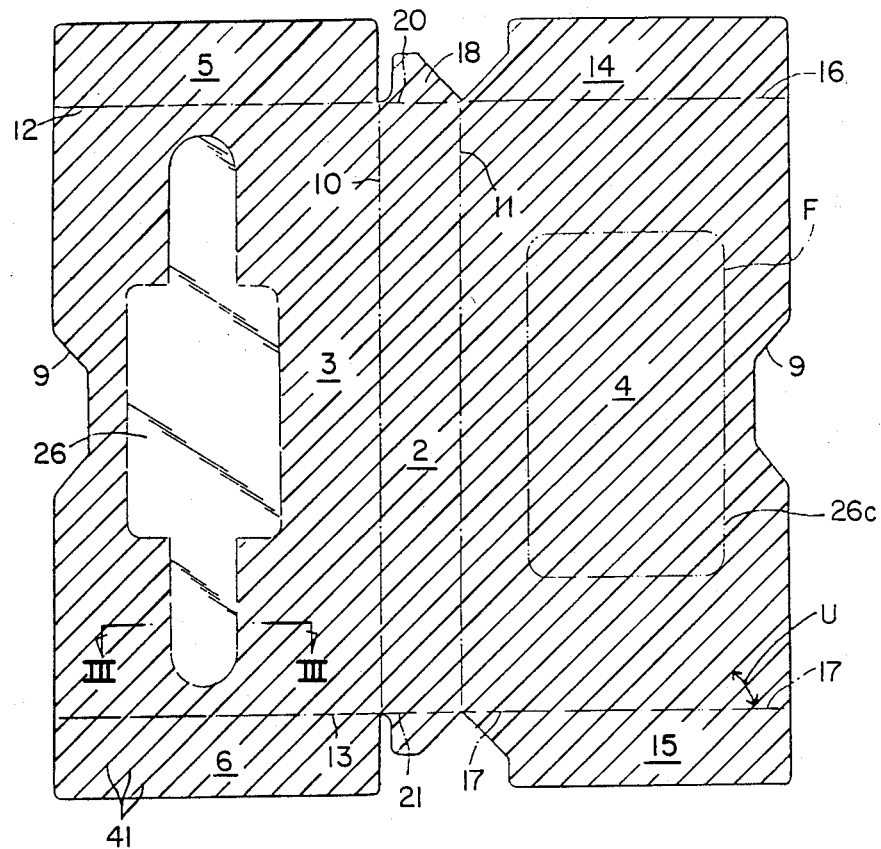
FIG. 9 is a plan view showing an unfolded case body of the cassette storage container shown in FIG. 8.
Figure 10:
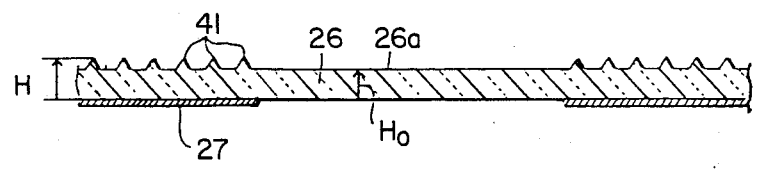
FIG. 10 is a partial cross sectional view showing an essential portion of the case body shown in FIG. 9.

Another embodiment of the cassette storage container is shown in FIGS. 8 through 10, wherein in order to provide the rough surface on the inner surface of the case body 1, there are formed a plurality of ribs 41 on the inner surface of the case body 1 except for the display window 26 so as to extend linearly and parallel each other at an angle U relative to one of the edge lines 17 of the case body 1. As shown in FIG. 10, each of the linear ribs 41 has a triangular shape in cross section with a height H higher than the height Ho of the inner face of the display window 26 which is made flat so as to provide a suitable transparency haze factor of less than 50%. The pitch of the adjacent two ribs is, for example, 1 or 2 mm. By this arrangement, when the video tape cassette 100 is pushed into the case body 1 through the opening 7, the outer surfaces of the video tape cassette are contacted only with the respective top edges of the ribs 41, thereby facilitating entry of the video tape cassette 100 into the case body 1. Furthermore, since in the area of the display window 26 the ribs 41 are not formed, the transparency of the display window 26 is assured, thereby facilitating seeing the label 25 from the outside of the case body 1. The height H of the ribs 41 may be equal to or lower than the height Ho of the display window 26, as shown in FIG. 11. However, by making the top ends of the respective ribs 41 higher than the inner face of the display window 26, as shown in FIG. 10, the tape cassette is prevented from being scratched when the tape cassette is introduced into the case body.

According to the present invention, the ribs 41 may be formed not only on the inside face but also on the outside face of the case body 1, except for the display window 26.

Figure 12:
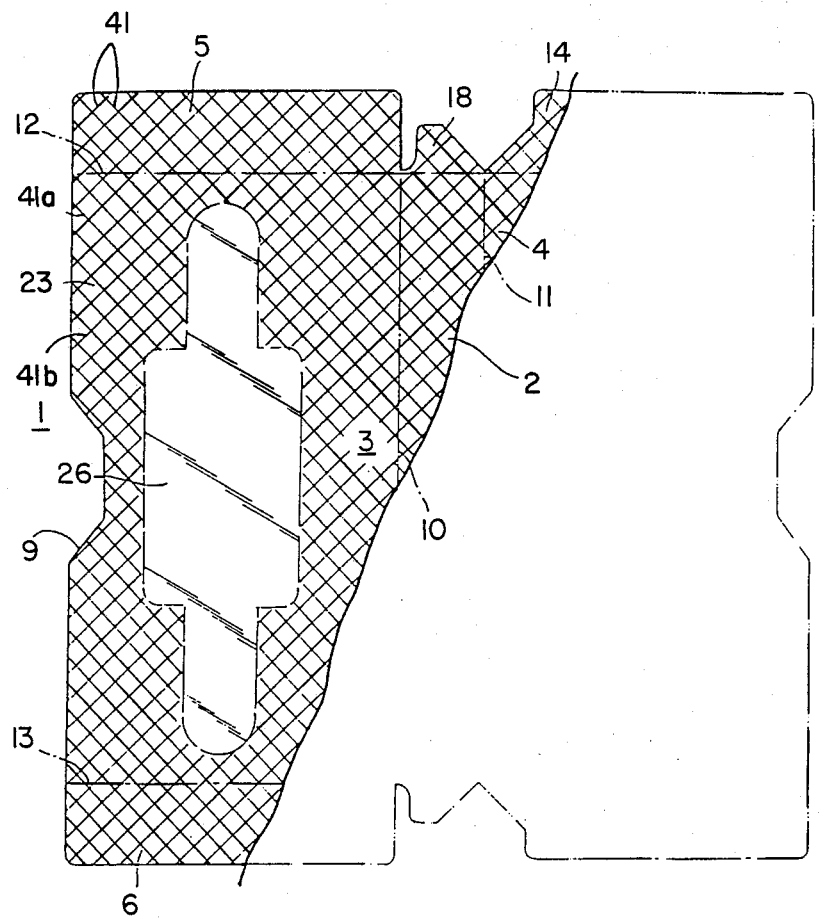
Figure 13:
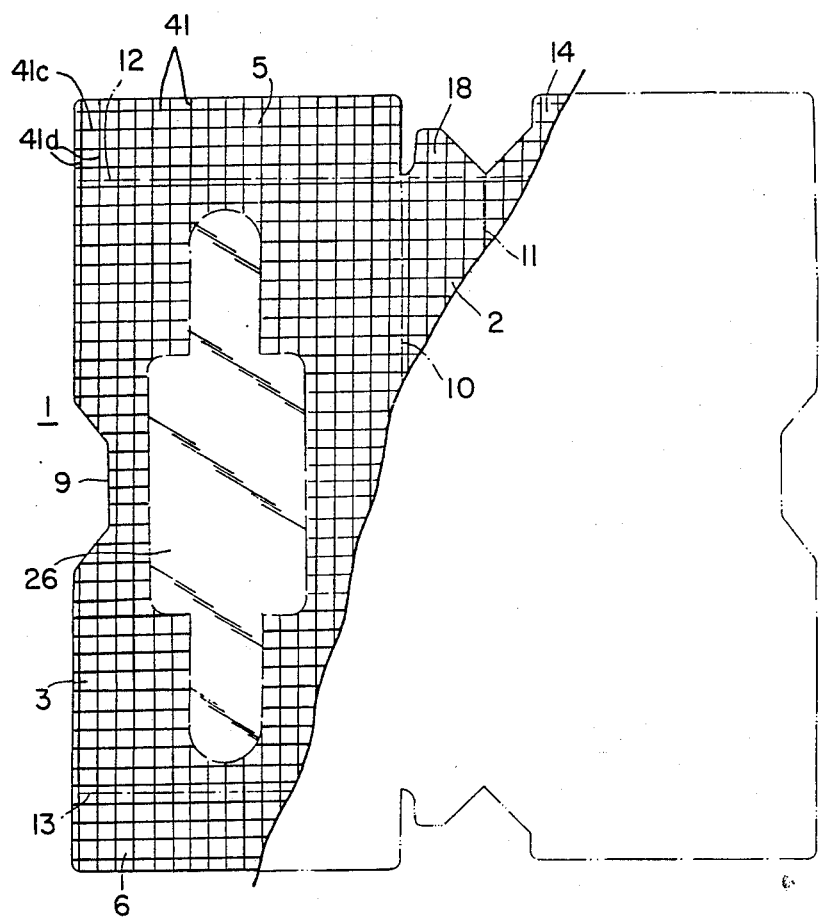

The ribs may be formed in the form of lattice or mesh in plan view, as shown in FIGS. 12 and 13. In FIG. 12, the ribs 41 are formed by the leftwardly slanted ribs 41a and the rightwardly slanted ribs 41b. In Fig, 13 the ribs 41 are formed by the ribs 41c extending laterally and the ribs 41d extending longitudinally with respect to one of the edge lines 13 of the case body 1.

Figure 14:
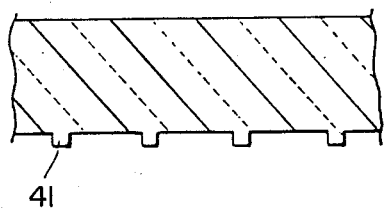
FIGS. 14 and 15 are partial cross sectional views showing further modifications of the inside of the cassette storage container according to the present invention.
Figure 15:
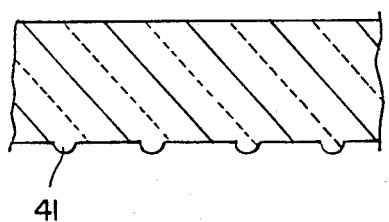

The shape of each of the ribs 41 in cross section may not only be triangular shape but may also rectangular, as shown in FIG. 14 or may have an arcuate shape as shown in FIG. 15.

Figure 16:
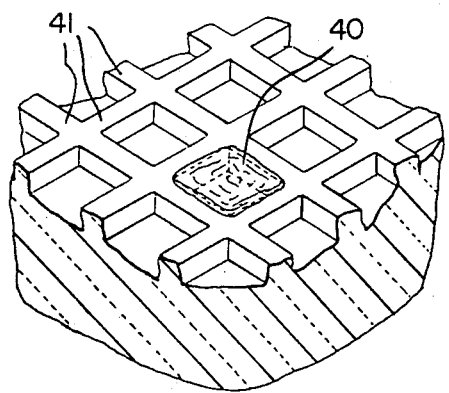
FIG. 16 is a partial enlarged perspective view showing the inside of the cassette storage container shown in FIGS. 12 and 13, FIGS. 17 and 18 are partial cross setional views showing still further modifications of the inside of the cassette storage container according to the present invention.

One advantage of the configuration of the ribs 41 in the form of the lattice or mesh as shown in FIGS. 12 and 13, is that since the hot melt bonding material 40 can be contained in the space surrounded by the ribs 41, as shown in FIG. 16, when any of two plates are bonded together leakage of the hot melt bonding material from the gap between the two overlapping plates can be prevented.

Figure 17:
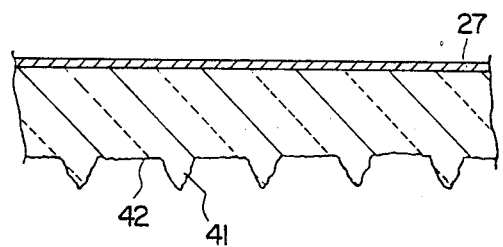

As shown in FIGS. 17 and 18, the inner surface of the case body 1 may be formed by a combination of ribs 41 and matte or satin finish faces 42 having small projections 42a on the intermediate portions between the ribs 41. In one embodiment, the height t of each of the small projections 42a is about 10 micron with the height T of each of the ribs 41 to be about 100 micron. The matte finished face 42 is effective to increase the area of the inside face of the case body to which bonding material is applied, thereby improving the bonding effect at the overlapping width portions.

In place of forming the ribs 42, a plurality of discontinuous projections 43 in the form of verrucae, the sectional shape of which is rectangular, triangular, or arcuate may be formed inside of the case body, as shown in FIG. 19.

Figure 20:
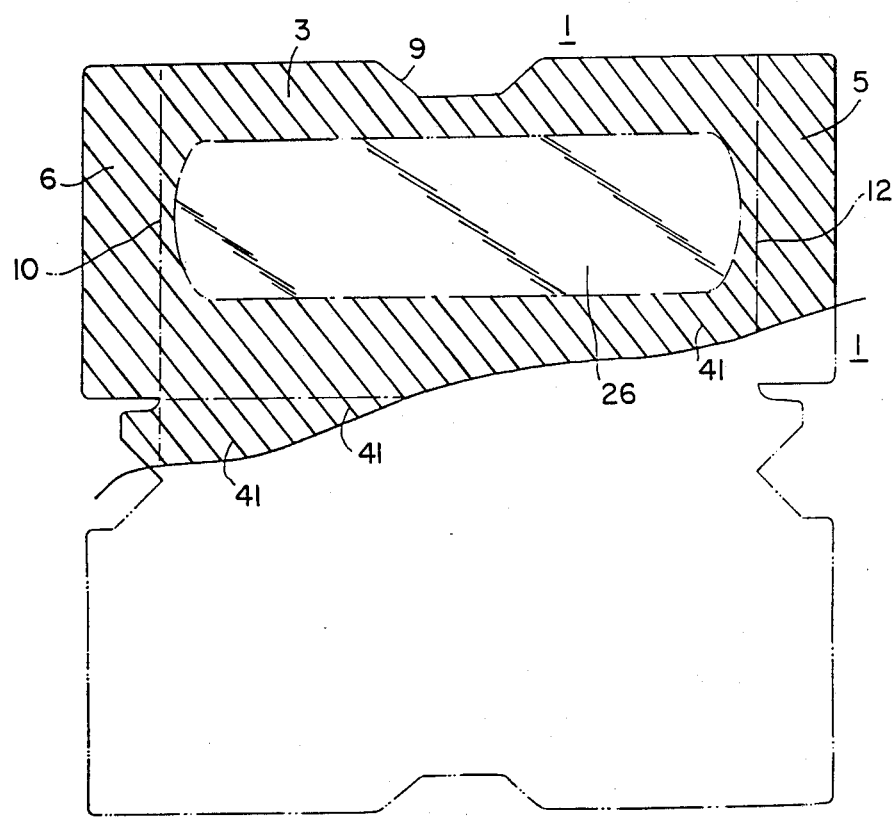
FIG. 20 is a partial plan view showing still a further example of the inside of the case body of the cassette storage container according to the present invention with the configuration of the window modified.
Figure 21:
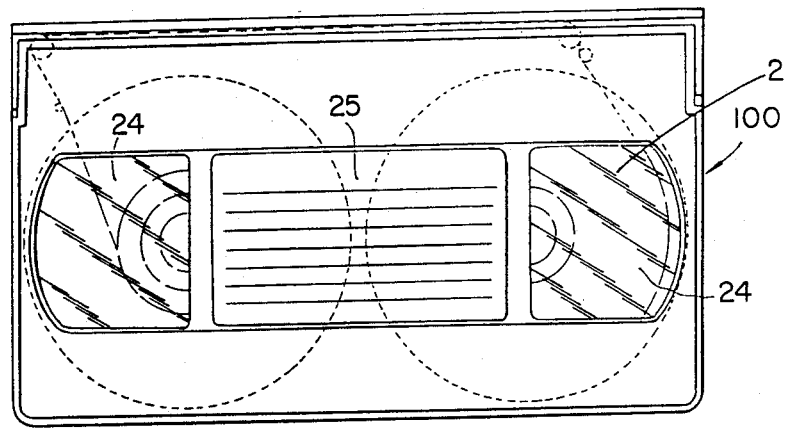
FIG. 21 is a top plan view showing the cassette storage container formed by the case body shown in FIG. 20.
Figure 23:
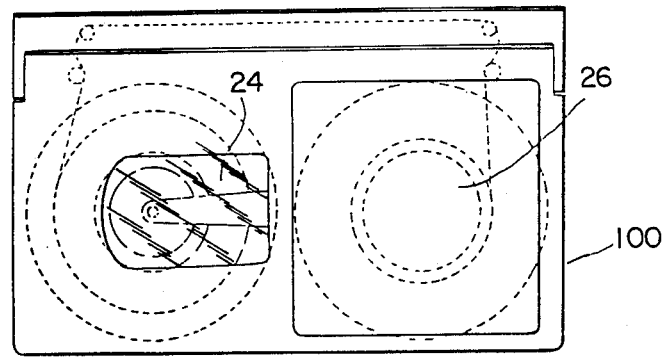
FIG. 23 is a top plan view showing the cassette storage container formed by the case body shown in FIG. 22.
Figure 22:
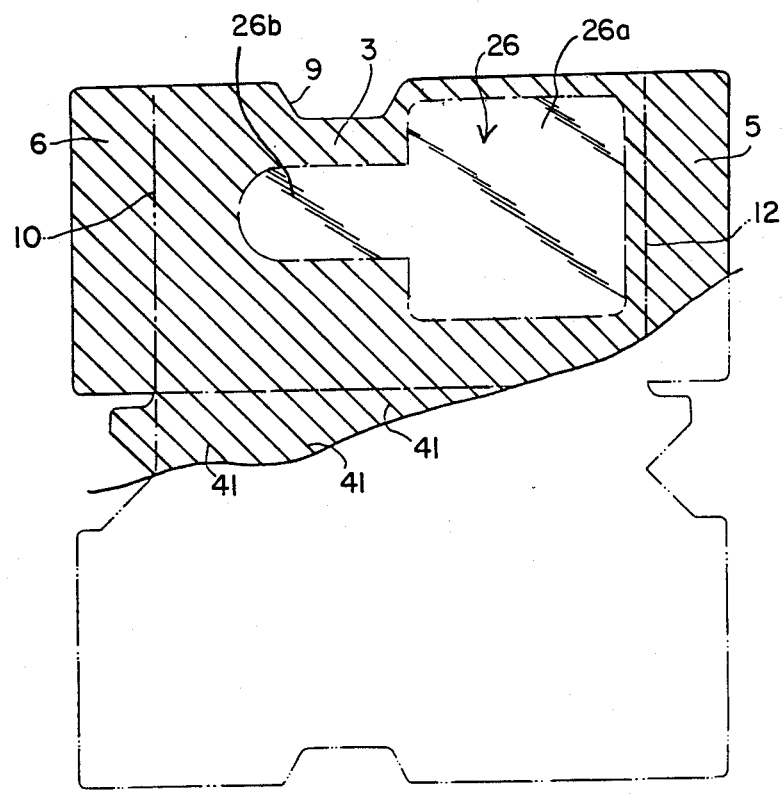
FIG. 22 is a partial plan view showing still a further example of the inside of the case body of the cassette storage container according to the present invention with the configuration of the window modified.

The configuration of the display window 26 may be varied depending on the configuration and the size of the labelled portion 25 of the video tape cassette 100. For example, for the video tape cassette of the VHS type having a pair of the transparent windows 24 on both sides of the label 25 at its central portion, as shown in FIG. 21, the display window 26 of the case body 1 may be formed as an elongated and arch-ended generally rectangular, shape as shown in FIG. 20. For the β type video tape cassette having the transparent window 24 at the left half portion and the label 25 at the right half portion, as shown in FIG. 23, the display window 26 may be formed by a combination of a generally rectangular portion 26a and a narrow portion 26b, as shown in FIG. 22. The display window 26 may be formed corresponding to only the label 25.

Figure 24:
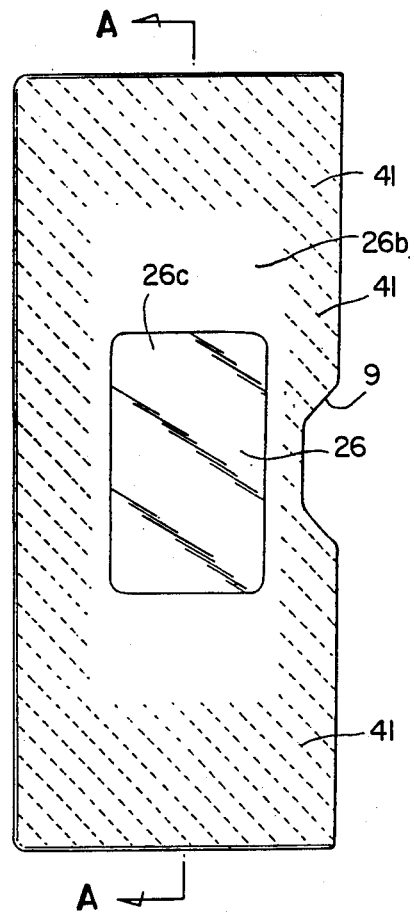
FIG. 24 is a plan view showing still a further example of the inside of the cassette storage container according to the present invention.
Figure 25:
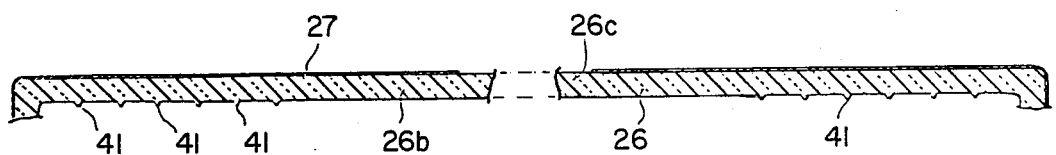
FIG. 25 is a cross sectional view taken along the line A—A in FIG. 24.

The outer face of the case body 1 may be made opaque by being coated with a colored coating layer 27. Provision of such a coating layer should be avoided for the area of the display window 26 where the projections are not formed. However in the case when the colored layer 27 is to be formed, the area without the colored layer is preferably smaller than the area without projections i.e., the area having a smooth face is to be formed larger than the area of the label 25 preliminarily as shown in FIGS. 24 and 25. Furthermore, the area of the transparent window where the colored layer is not coated does not necessarily or strictly have to correspond to the area of the smooth face. In other words, it may be possible to provide ribs all over the inside area of the case body 1 and to provide a coating layer 27 with a non-coating window area so that the window area of the coating layer forms the window 26 of the case body 1.

Furthermore, another transparent window 26c may be defined on another side plate of the case body as shown by the chain line F in FIG. 9 so as to enable a viewer to see various information provided on an auxiliary sheet attached between the bottom face of the video tape cassette 100 and the side plate 4 from outside of the case body. In this case it may be chosen not to provide the projections 41 in the area 26c to provide the smooth face without projections.

In the foregoing, the case body is formed by folding the unfolded sheet. However, the cassette storage container according to the present invention can be integrally formed by a molding technique so far as the projections for providing the rough surface at least inside of the case body, is concerned. It is noted that in place of forming the opaque layer on the face of the case body 1 by way of printing the colored layer, either the outer face or the inner face or both of the inner and outer faces of the case body may be formed by the matte finish face with a high density of the projections. In this case the window area may also have a matte finish face with a low density of the projections to provide the required transparency. It is further noted that the cassette storage container according to the present invention can be used for various type of recording tape cassette.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cassette storage container comprising an inner and outer surface formed of a single plastic resin sheet of transparent or translucent material in the shape of a box having opposing top and bottom plates, opposing side plates and a rear plate with an open front for inserting a cassette, each of said plates having an inner face which together constitute said inner surface of said container, substantially the entire inner surface of said container having a roughened finish so as to facilitate slippage of said cassette into said storage container, said roughened surface finish imparting to said plastic resin sheet material a transparency, haze factor of less than 50%, said outer surface of said container having a smooth finish provided with an opaque layer on at least a portion thereof except for a label area defining a display window for displaying a corresponding label of a cassette stored in said container.

2. The cassette storage container of claim 1, wherein said roughened finish is in the form of ridges.

3. The cassette storage container of claim 2, wherein said ridges extend obliquely relative to respective edges of said container.

4. The cassette storage container of claim 3, wherein said ridges are in oblique parallel rows.

5. The cassette storage container of claim 3, wherein said ridges are in oblique intersecting rows.

6. The cassette storage container of claim 2, wherein said ridges extend a right angles relative to respective edges of said container intersecting in such a manner so as to form a grid network.

7. The cassette storage container of claim 1, wherein said transparency haze factor is less than 5%.

* * * * *